UNITED STATES PATENT OFFICE.

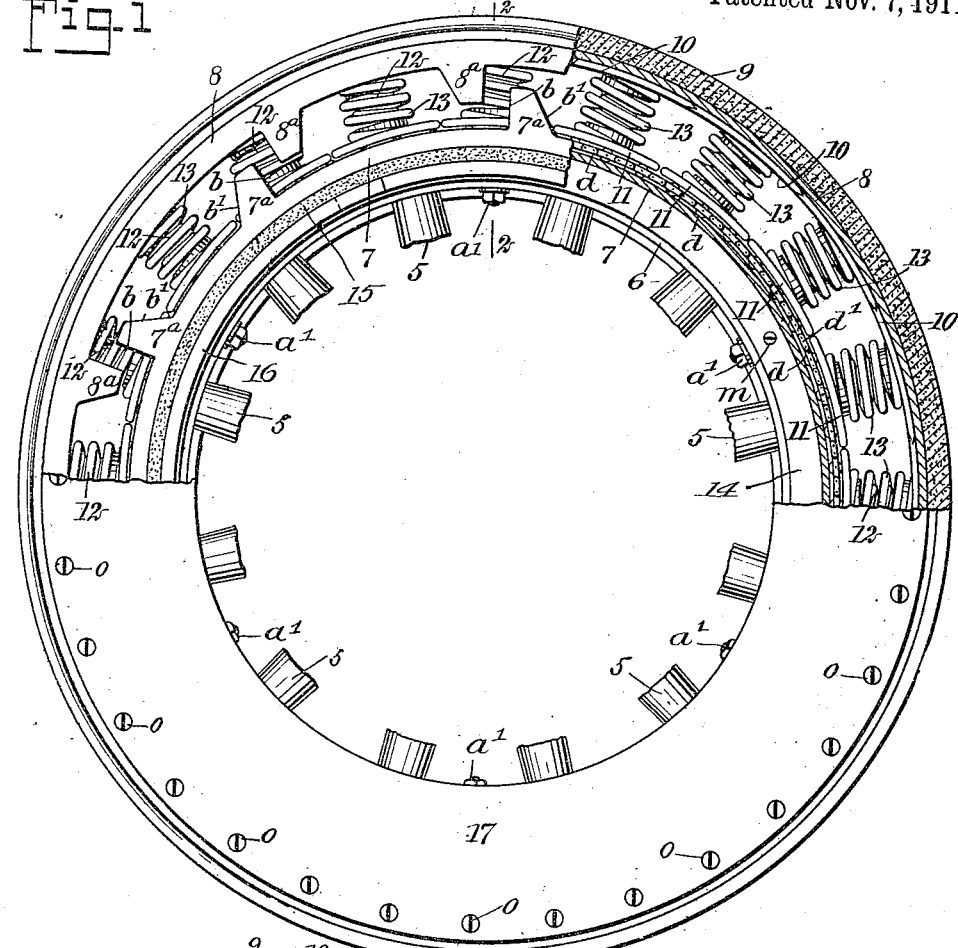

WILLIAM HENRY WALES, JR., OF NORFOLK, VIRGINIA.

RESILIENT METALLIC VEHICLE-WHEEL.

1,008,224. Specification of Letters Patent. Patented Nov. 7, 1911.

Application filed October 15, 1908. Serial No. 457,829.

*To all whom it may concern:*

Be it known that I, WILLIAM H. WALES, Jr., a citizen of the United States, and a resident of Norfolk, in the county of Norfolk and State of Virginia, have invented a new and Improved Resilient Metallic Vehicle-Wheel, of which the following is a full, clear, and exact description.

The purpose of this invention is to provide a vehicle wheel tire composed mainly of resilient metal, which is constructed having coöperative elements, which are so combined that equal support and resilience under load-strain, are afforded for all parts of the wheel.

The invention consists in the novel construction and combination of parts, as is hereinafter described, and defined in the appended claims.

Reference is to be had to the accompanying drawings forming a part of this specification, in which similar characters of reference indicate corresponding parts in all the views.

Figure 1 is a side view of a vehicle wheel embodying details of the invention, parts being removed to disclose other novel features; Fig. 2 is an enlarged transverse sectional view, substantially on the line 2—2 in Fig. 1; Fig. 3 is an enlarged plan view of one of a plurality of similar spacing plates employed; and Fig. 4 is a similar view of a series of spacing plates, slightly differing in construction from the spacing plate shown in Fig. 3.

In the drawings which illustrate the construction and relative arrangement of novel details of the improvement, 5 indicates a plurality of spokes for a vehicle wheel, that, in completed condition, radiate from a hub, and may represent the body of an automobile wheel of approved style; and upon the outer ends of said spokes, a rim 6 of hard wood is mounted thereon as usual.

Upon the rim 6, a metallic primary ring 7 is closely fitted and secured by a number of spaced bolts $a$, that have counter-sunk heads on their outwardly projected ends and nuts $a'$, on their inwardly-projecting ends. The ring 7 is provided at each side with a plurality of radially projected and oppositely arranged lugs $7^a$. The lugs on each side of the ring are arranged in pairs and the lugs of a pair have their opposing faces $b$ straight while their opposite faces $b'$ are inclined. A supplementary ring 8 of an increased diameter is provided, which is, when parts are assembled, disposed concentric with the primary ring 7, and suitably spaced therefrom. Upon each of the side edges of the concentric ring 8, a series of depending lugs $8^a$ is formed, said lugs being equal in number with and corresponding in shape to the lugs $7^a$. The width of the rings 7, 8 is the same, so that the lugs $8^a$, which are disposed respectively between the lugs $7^a$ at each side of side rings, have their outer side edges opposed in pairs, and, as shown in Fig. 1, the side edges on the lugs $8^a$, which are adjacent to the radial edges $b$ on the lugs $7^a$, are radially formed thereon, and disposed in pairs therewith, from which they are spaced a suitable distance. The supplementary ring 8 is peripherally channeled and said channel is preferably undercut on its side walls.

A tread ring 9, formed of rubber or other suitable elastic material, is embedded in the peripheral channel formed for its reception in the supplementary ring 8.

Preferably the peripheral surface of the primary ring 7, is recessed, forming similar side flanges $c$, $c$, from which the lugs $7^a$ radiate, and in said recess a series of similar rollers $d$ are seated transversely; said rollers in number sufficient to extend around the ring, are all spaced apart and loosely secured in that condition by a series of links $d'$ that are engaged by pivots that are axially extended from the rollers. The supplementary ring 8 is annularly recessed on the inner surface, as shown at $e$ in Fig. 2, forming two inwardly-projecting similar flanges $g$ at the side edges thereof, the lugs $8^a$ radiating from said flanges.

A series of similar spacing plates 10, is a feature of the invention, these plates being metal planchets having parallel side edges and a width that adapts them for free insertion in the recess $e$ formed in the supplementary ring 8, and a slight curvature longitudinally which adapts said plates for contact with the bottom of the recess $e$. The spacing plates 10 at their ends have a tongue and grooved connection one with the other, and are provided in sufficient number to extend completely around the tire 8 within the recess $e$. On the side of each spacing plate 10 that is opposite from that which seats on the bottom of the recess $e$ and at the center thereof, an annular collar $h$ is formed.

A series of spacing plates 11, similar in width to that of the spacing plates 10, is arranged in sequence and supported by the rollers $d$, the ends of said plates being convexed on their edges that are next each other in pairs, with sufficient space between to allow free movement. Upon the outer side surface of each spacing plate 11, a collar $i$ similar to the collars $h$, is formed centrally, and each plate 10 is disposed directly opposite one of the spacing plates 11.

In the circular space within each of the collars $h$ and $i$ on each pair of opposite plates 10, 11, a strong coiled spring 12 is seated at the respective ends thereof, and encircling each of said coiled springs, a reinforcing coiled spring 13 is mounted thereon, the ends of the latter receiving the opposite collars $h$, $i$, as is clearly shown in Fig. 2. The coiled springs 12, 13 are all placed in position in and on the collars $h$, $i$, under compression sufficient to adapt the springs for exerting their tensional force upon the spacing plates 10, 11, and the latter serve to evenly space apart each set of springs, as shown in Fig. 1.

It will be noted that when in normal condition, that is, when not subjected to load strain, the equal resilient and expansive force of the springs 12, 13, maintains the supplementary ring 8 concentric with the ring 7.

Upon each side of the wheel rim 6, a metal facing ring 14 is secured by a plurality of screws $m$, and upon each of said facing rings a packing ring 15, of suitable material that will resist the intrusion of water and dust, is held in position by a metal keeper ring 16 that is resilient and is formed with a lap joint, as at $n$ in Fig. 2. Upon the exterior surface of the supplementary ring 8, at each side thereof, an annular clamping ring 17, is secured by machine screws $o$ that have countersunk heads and are screwed through the flanges $g$. As shown in Fig. 2, the ends of the screws $o$ are reduced and rounded, thus adapting said ends for an engagement with the spacing plates 10, whereby said plates are supported in their relative positions. The clamping rings 17 have sufficient width to enable their clamping engagement with the sides of the flanges on the primary ring 7, and also bear against the packing joint rings 15 and keeper rings 16, with force enough to prevent the entrance of dampness or dust, but at the same time permit a rotative movement of said rings.

In operation, the weight imposed on the wheel will compress the springs 12, 13, below and near the center thereof, and the resistance to progressive motion will cause the spacing plates 10 and coiled springs engaged therewith to slide the short distance that may intervene between the lugs $7^a$, $8^a$. When the lugs $8^a$ impinge upon the lugs $7^a$, the slight creeping action is arrested, and the wheel as an entirety is rolled upon the roadbed.

The progressive rolling movement of the improved wheel will successively transmit load strain from the lower springs to those immediately following said springs, the resilience of the springs along with the supplementary ring 8, serving to absorb the shocks sustained by the improved tire due to a rough roadbed.

It is claimed for the improvement that the wheel is strong, durable, effective in service, excludes the elements, can be readily detached into component parts for repair, and that may be manufactured without requiring special tools, at a moderate cost.

Having thus described my invention, I claim as new and desire to secure by Letters Patent:

1. In a vehicle wheel, a rim, a primary ring secured to the rim and provided with side flanges each having spaced lugs, a supplementary ring of greater diameter than the primary ring and provided with side flanges, each having spaced lugs, a set of spacing plates on each ring, the plates of one set having a tongue and groove connection and the plates of the other set being disconnected and having rounded ends, and springs interposed between the spacing plates.

2. In a vehicle wheel, a rim, a primary ring secured to the rim and provided with side flanges, each having spaced lugs, a supplementary ring of greater diameter than the primary ring and provided with side flanges, each having spaced lugs, a plurality of spacing plates on each ring and having annular collars on their opposing faces, the plates of one set being loosely connected with each other and the plates of the other set disconnected but contacting with each other, and two springs interposed between opposing plates one within the other, one spring being seated in the collars of said plates and the other receiving said collars.

3. A vehicle wheel embodying a rim, a primary ring bolted upon the rim, a series of spaced radial lugs formed on each side edge of the primary ring, a supplementary ring having greater diameter than the primary ring, spaced lugs extended from each side edge of the supplementary ring in sequence and between the other series of lugs, a series of spacing plates seated on the inner side of the supplementary ring and loosely connected in sequence, anti-friction rollers imposed upon the outer surface of the primary ring, a series of spacing plates seated upon said anti-friction rollers and movable thereon, and a plurality of coiled springs interposed and held in position between the opposite spacing plates of the two series.

4. A vehicle wheel, embodying a rim, a flanged primary ring bolted upon the rim, a series of spaced radial lugs on each flange of the primary ring, a flanged supplementary ring having greater diameter than the primary ring, a series of spaced lugs projected from the flanges of the supplementary ring between the other series of lugs, a continuous series of rollers seated transversely on the primary ring, a plurality of spacing plates seated upon and longitudinally movable on the rollers, a series of spacing plates seated on the inner surface of the supplementary ring, and a plurality of coiled and radially disposed springs engaged at their ends with the respective pairs of the spacing plates and normally disposing the rings concentric with each other.

5. In a vehicle wheel, the combination with a rim, a primary ring on the rim, a supplementary ring, and coiled springs interposed between the said rings, of a clamping ring on each side and secured to the supplementary ring, resilient keeper rings between the rim and clamping rings and having lap joints, and packing rings between the rim and clamping rings and the keeper rings and the primary ring.

6. In a vehicle wheel of the character described, the combination with the rim, a ring secured on the wheel rim, and a larger ring, of rollers arranged in a band and seated upon the smaller ring, a plurality of similar spacing plates imposed upon the rollers, a series of spacing plates held in contact with the inner surface of the larger ring, collars formed on all the spacing plates, and coiled springs arranged in pairs one within the other and engaged with the opposed pairs of the collars.

In testimony whereof I have signed my name to this specification in the presence of two subscribing witnesses.

WILLIAM HENRY WALES, Jr.

Witnesses:
R. D. PARROTT,
CHARLES WALES.